Dec. 24, 1929.     E. FRISCHMUTH     1,740,852
NUT LOCKING WASHER
Filed July 5, 1928

Inventor
Ernst Frischmuth
by Paul R. Phillips
Attorney

Patented Dec. 24, 1929

1,740,852

UNITED STATES PATENT OFFICE

ERNST FRISCHMUTH, OF SIEMENSSTADT, NEAR BERLIN, GERMANY

NUT-LOCKING WASHER

Application filed July 5, 1928, Serial No. 290,381, and in Germany April 27, 1928.

My invention relates to improvements in spring washers employed for locking nuts and more especially to that class of spring washers which are formed of a spring split ring having its ends projected in opposite directions to act as pawls against the nut and the fish-plate. A guard ring having an opening to receive said spring ring is fitted over the latter. The spring washer has a normal thickness less than the normal distance between its ends, so that the nut will partially compress said spring washer sufficiently to cause the same to lock. In the use of the washer it is found that the nut must be turned up against the guard for holding the latter in its operative position.

The object of the invention is to provide a spring washer and guard ring which are so united as to permit free axial movements of the locking ends of the washer while preventing disconnection or relative displacement of the washer and ring or flattening of the latter to such a degree as to cause it to break.

Figure 1:
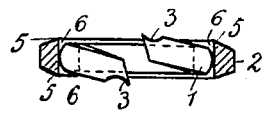
Figure 2:
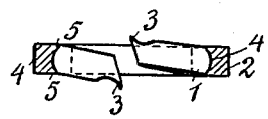
Figure 4:
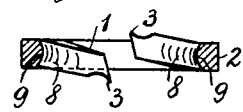
Figure 3:
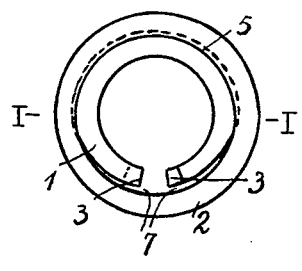
Figure 5:
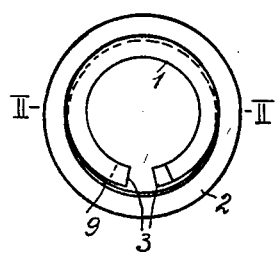
Figure 6:
Figure 7:
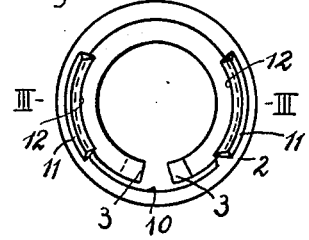
Figure 8:
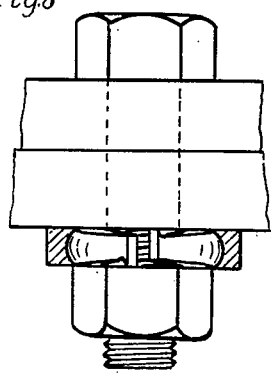

I attain these objects by improvements illustrated in the accompanying drawing, in which: Fig. 1 is a view of the washer and of the guard ring fitted over the washer, the guard ring being sectioned and shown as it appears before being compressed by the die; Fig. 2 is a view similar to Fig. 1 showing the guard ring as it appears after compression by the die; Fig. 3 is a plan view of the connected washed and ring; Fig. 4 is a view similar to Fig. 2, showing a modification; Fig. 5 is a view similar to Fig. 3 of the ring shown in Fig. 4; Fig. 6 is a view similar to Figs. 2 and 4, showing another modification; Fig. 7 is a plan view of the same washer and guard fastened together; and Fig. 8 is a view showing the application of the nut locking washer to a rail joint bolt.

The split spring washer 1 has its sharp edged ends or points 3 projecting in opposite directions to act as pawls as is well known. It is also well known to fit over said washer 1 a guard ring 2 for limiting the degree of flattening the spring washer. When the washer is flattened to an abnormal degree it is apt to burst and its flying pieces may cause injury to persons in its vicinity. To prevent this objection is the purpose of my invention. For attaining this end the washer 1 is secured to the guard ring 2 by suitable coupling or locking means.

To secure the washer 1 in place within the guard ring 2 in the constructional form shown in Figs. 1 and 2, the ring 2 is formed with a cylindrical opening wide enough for admitting said ring to be fitted over the washer 1, as shown in Fig. 1. The said ring has a trapeziform radial section tapering towards the outer face to form raised marginal portions 5 projecting above the top-face of the washer 1. The said ring 2 may be formed by a piece of metal tubing having a ring-shaped sectional form. When the ring 2 has received the washer 1, they are put into a die and pressure applied to cause the die to force the raised portions 5 of the ring 2 towards the washer 1 so as to extend inwardly over marginal portions of the washer 1 and to encircle the latter partly, for coupling or locking the washer 1 to the guard ring 2. The washer 1 is eccentrically placed in the ring 2 in such a manner that the points 3 of the washer 1 are radially spaced from the flanged portions 5 of the ring at 7 for enabling the points 3 to travel in the space 7 without striking against the guard ring 2.

In the form shown at Figures 4 and 5, the washer 1 is provided at a greater part of its periphery with a slot or key-way 8, and the guard ring has a radially curved face 9 projecting into the slot or key-way. Thus it is seen that the projecting curved part 9 of the guard ring 2 holds the washer 1 in its operative position for locking it to the guard ring 1.

In the construction shown in Figures 6 and 7, the guard ring 2 is formed from a piece of tubing provided with an excavation 10 adapted to offer a complete free play to the travel of the edges 3 when the washer 1 is flattened in its operative position. In order to produce means for coupling the washer 1 with the guard, without the aid of the nut to be locked, there are formed in the frontal faces of the guard ring 2 circumferential spaced impressions 11 and lugs or lips 12 extending inwardly radial thereof so as to overlap adjacent marginal portions of the washer 1.

The guard ring 2 may be made preferably of brass, bronze or similar soft (ductile) metal.

If it is desired, the walls of the washer 1 and of the guard ring 2 may be attached together by means of welding.

In the arrangement illustrated in Fig. 8, the guard ring 2 is secured to the washer 1 bearing against the nut and the fish-plate of a screw-threaded bolt-joint.

I claim:

1. A nut lock comprising an axially compressible split lock washer, and a ring-shaped guard washer embracing said split lock washer, said guard washer and said split lock washer being provided at portions of their adjacent faces with radially extending means interlocking them between the planes of the lateral faces of said guard washer and spaced from the extremities of said split lock washer to leave said extremities free to move axially.

2. A nut lock comprising an axially compressible split spring lock washer, and a ring-shaped guard washer of soft metal embracing said lock washer, said lock and guard washers being provided with interlocking means between the planes of the lateral faces of said guard washer and spaced from the extremities of said split lock washer, to leave said extremities free to move axially.

In testimony whereof I have affixed my signature.

ERNST FRISCHMUTH.